O. W. KRUM.
STONE CUTTING MACHINE.
APPLICATION FILED JUNE 1, 1915.

1,287,346.

Patented Dec. 10, 1918.
8 SHEETS—SHEET 7.

WITNESSES

INVENTOR
Otis W. Krum.
BY
ATTORNEYS

UNITED STATES PATENT OFFICE.

OTIS W. KRUM, OF NEW YORK, N. Y.

STONE-CUTTING MACHINE.

1,287,346.   Specification of Letters Patent.   Patented Dec. 10, 1918.

Application filed June 1, 1915. Serial No. 31,406.

*To all whom it may concern:*

Be it known that I, OTIS W. KRUM, a citizen of the United States, and a resident of the city of New York, Springfield Gardens, borough of Queens, in the county of Queens and State of New York, have invented a new and Improved Stone-Cutting Machine, of which the following is a full, clear, and exact description.

The object of the invention is to provide a new and improved machine for cutting granite or other stone and other materials to ornament the face thereof according to a predetermined design and without requiring undue physical exertion on the part of the operator.

In order to accomplish the desired result, use is made of a row of chisels or hammers actuated simultaneously by power, longitudinal feeding means for simultaneously feeding the chisels bodily in the direction of the length of the row of chisels, and feeding means for simultaneously feeding the said chisels up or down. Use is also made of rocking means for rocking the row of chisels in a transverse direction to set the chisels at a desired angle relatively to the work, and use is also made of adjusting means for adjusting the row of chisels in a transverse direction.

A practical embodiment of the invention is represented in the accompanying drawings forming a part of this specification, in which similar characters of reference indicate corresponding parts in all the views.

The cutting machine is mounted on a suitably constructed frame A and use is made of one or more gangs or rows of cutting tools preferably in the form of chisels, and adapted to cut on the face of a block C of stone or other material. As shown in the drawings, one longitudinal row of cutting tools B is employed to cut the uppermost face of the block C with a view to ornament the same according to a predetermined design C' (see Fig. 3), preferably marked on one side end of the block as a guide for the operator to enable the latter to correctly set the tools B, as hereinafter more fully explained. The cutting tools B are removably held in holders D carried by a carriage E mounted to travel in a longitudinal direction, that is, in the direction of the row of cutting tools, on a bed F provided at its ends with trunnions G journaled in bearings H mounted to slide up and down in heads I mounted to slide in a transverse direction on guideways J attached to or forming part of the main frame A. By the arrangement described, the bed F can be turned to set the cutting tools B into a right angle position relatively to the configuration of the design to be produced on the face of the block C, and by having the bearings H vertically adjustable on the heads I the bed F with the carriage E and the tools B thereon can be raised or lowered, and by making the heads I adjustable in a transverse direction the bearings H, bed F, carriage E and the tools B mounted thereon can be adjusted in a transverse direction so as to bring the cutting tools B transversely into the desired position relatively to the predetermined design C'.

In order to actuate the cutting tools B, use is made of power devices, preferably in the form of pneumatic hammers, having their cylinders K disposed vertically and mounted to slide in bearings E' attached to or forming part of the carriage E. Each cylinder K has the piston rod K' of its piston K² in axial alinement with the corresponding cutting tool B so that the lower end of the piston rod K' normally rests on the upper end of the cutting tool B, which latter is normally held in an uppermost position by a spring B' resting on top of the corresponding holder D and engaging a collar B² near the upper end of the cutting tool B, as plainly shown in Fig. 6. It will be noticed that by the arrangement described the spring B' not only sustains the cutting tool B but also the weight of the piston K² used for imparting blows to the cutting tool B against the tension of its spring B', whereby the cutting edge of the tool B cuts into the face of the block C. Each cylinder K is provided at its upper end with a pipe K³ connected by hose L with a branch pipe L' having a valve L² and connected with a main supply pipe L³ attached to the carriage E and connected by hose L⁴ (see Fig. 2) with a suitable source of pressure supply, preferably compressed air. Thus when the valves L² are in open position the compressed air can pass into the cylinder K to actuate the pistons K² therein and thus cause the piston rods K' to impart blows to the cutting tools B in rapid succession for the purpose previously mentioned.

Figure 9:
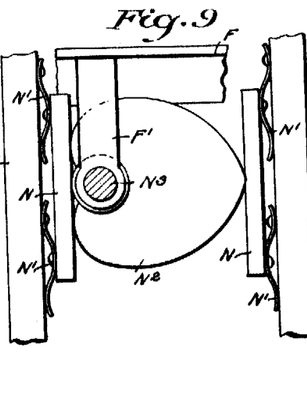
Fig. 9 is an enlarged side elevation of the cam device for imparting a longitudinal traveling motion to the carriage carrying the row of chisels.
Figures 10, 11:
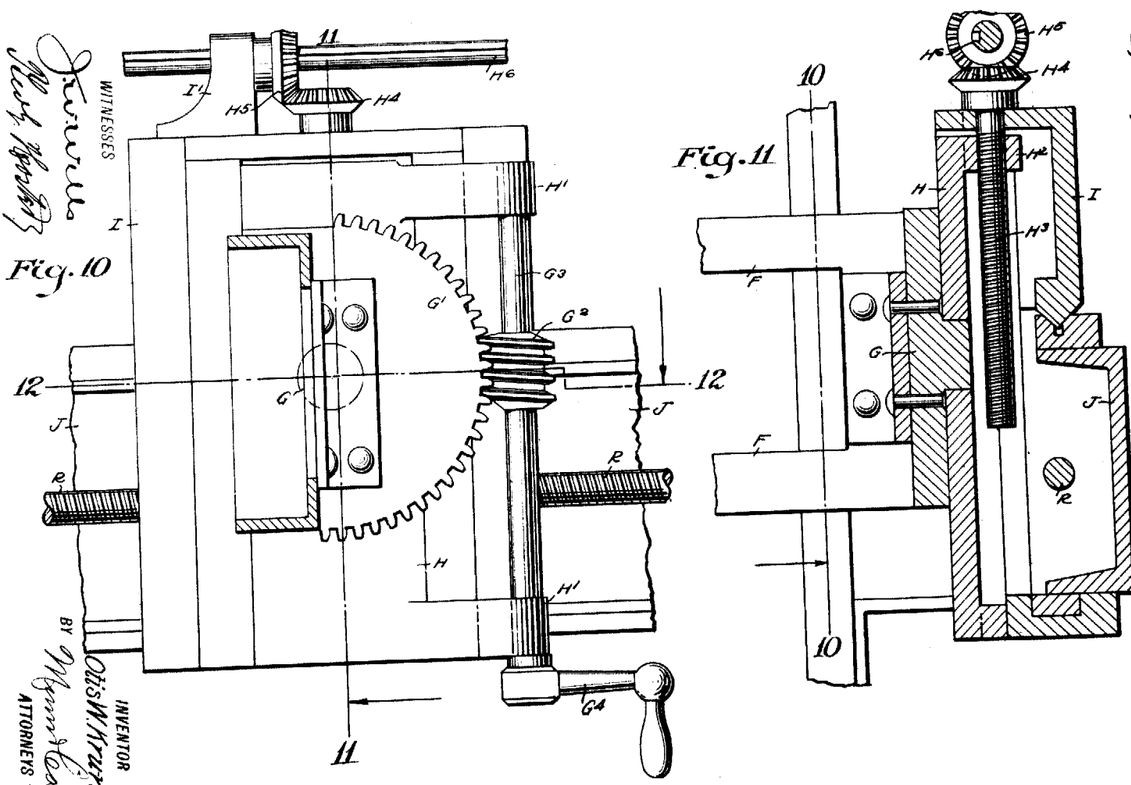
Fig. 10 is an enlarged cross section of the mechanism for rocking the carriage bed and for moving the bearing for the carriage bed up and down on the head and for shifting the latter transversely on the guideway, the section being on the line 10—10 of Fig. 11.
Fig. 11 is a sectional side elevation of the same on the line 11—11 of Fig. 10.
Figure 12:
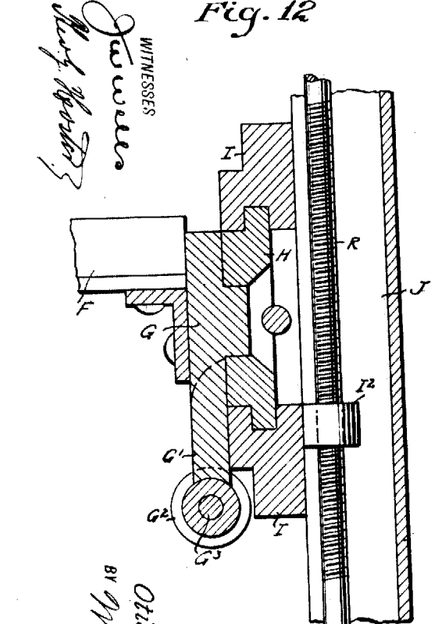
Fig. 12 is a sectional plan view of the same on the line 12—12 of Fig. 10.

In order to impart a reciprocating movement to the carriage E on the carriage bed F, the following arrangement is made: On the middle of the carriage E are arranged plates N yieldingly mounted on the carriage E by springs N' and between the plates N is arranged a heart-shaped cam N² engaging with its peripheral face the opposite faces of the plates N, as plainly indicated in Figs. 2 and 9. The cam N² is attached to a cam shaft N³ extending transversely in a rearward direction and journaled in suitable bearings F' attached to the carriage bed F. The rear end of the cam shaft N³ is connected by a universal joint N⁴ with a shaft N⁵ connected by a universal joint N⁶ with a shaft N⁷ mounted to turn and to slide in a suitable bearing N⁸ attached to the main frame A (see Fig. 3). The shaft N⁷ is connected by key and keyway with a worm wheel O in mesh with a worm O' secured on a shaft O² extending longitudinally at the back of the main frame A and journaled in suitable bearings arranged on the said frame.

Figure 3:
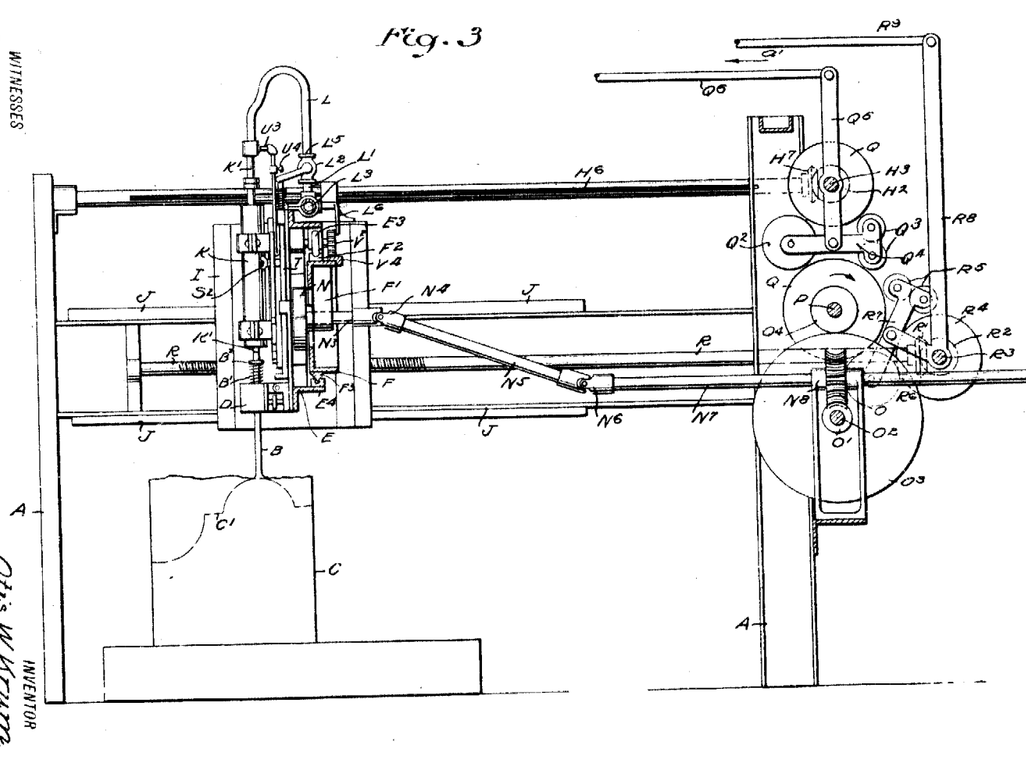
Fig. 3 is a transverse section of the same on the line 3—3 of Fig. 1.
Figure 4:
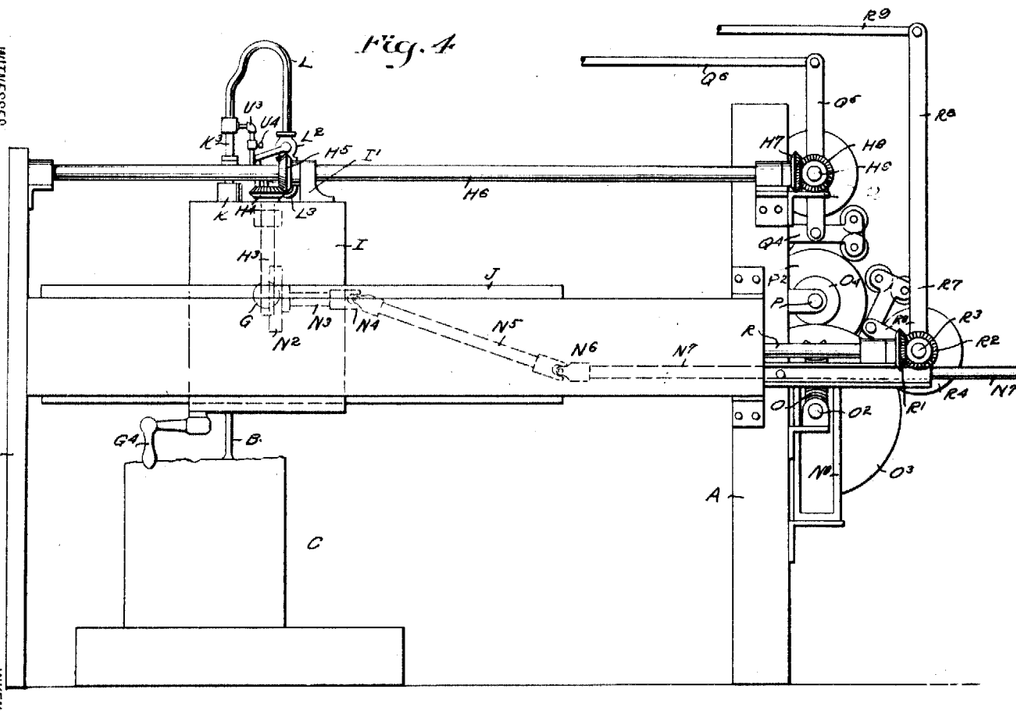
Fig. 4 is an elevation of the right-hand end of the cutting machine.

The wheel O is held against sliding movement by the bearing N⁸ (see Fig. 3). On the shaft O² is secured a friction wheel O³ in frictional contact with a friction pinion O⁴ secured on the main shaft P journaled in suitable bearings arranged on the main frame A. The main shaft P is provided with fast and loose pulleys P' connected by a belt with other machinery for imparting a rotary motion to the main shaft P which by the pinion O⁴ and the wheel O³ imparts a turning motion to the shaft O² which by the worm O' and worm wheel O rotates the shafts N⁷, N⁵ and N³ thus rotating the cam N² and thereby causing the cam to impart a reciprocating movement to the carriage E. The throw of the cam N² corresponds approximately to the distance between adjacent cutting tools B.

It is understood that a rough block of granite has a very irregular surface, and its face is cut by the tools B through a percussion action and consequently the tool cannot be dragged or forced through the irregularities and therefore a resiliency must be provided in the movement of the carriage E to remove a non-working tool from contact with the face of the block. The natural spring in the steel tool and in the granite under a blow provides certain almost instantaneous removals from the face of the granite and permits the movement of the carriage, but sometimes there will be delays (very slight ones) in this clearance and these have to be provided for by give and take in the carriage movement and consequently the cam N² is in contact with the yielding plates N held on the carriage.

In order to rock the bed F and with it the carriage E and the cutting tools and power hammers mounted thereon, the following arrangement is made, special reference being had to Figs. 1, 2, 10, 11 and 12: On one of the trunnions G, preferably the one on the right-hand side, is secured or formed a segmental worm wheel G' in mesh with a worm G² secured on a worm shaft G³ disposed vertically and journaled in suitable bearings H' arranged on the bearing H. On the lower end of the shaft G³ is secured a handle G⁴ under the control of the operator to enable the latter to turn the worm shaft G³ and with it the worm G² to turn the worm wheel G' and with it the trunnion G to rock the carriage bed F until the cutting tools B permit the desired right-angle position relatively to the configuration of the design to be produced on the face of the block C.

In order to impart an up and down feeding movement to the bearings H, the following arrangement is made: The bearings H are provided at their upper ends with nuts H² in which screw vertically disposed screw rods H³ mounted to turn in the top of the heads I, so that when the screw rods H³ are turned a vertical sliding movement is given to the bearings H and consequently to the bed F, the carriage E, the tools B and the power hammers. The upper ends of the screw rods H³ are provided with bevel gear wheels H⁴ in mesh with bevel gear wheels H⁵ connected by keys and keyways with transversely extending shafts H⁶ journaled in suitable bearings on the main frame A. The rear ends of the shafts H⁶ are provided with bevel gear wheels H⁷ in mesh with bevel gear wheels H⁸ secured on the ends of a longitudinally extending shaft H⁹ journaled in suitable bearings arranged on the back of the main frame A. The bevel gear wheels H⁵ are engaged by brackets I' held on the heads I so as to move with the latter along the shafts H⁶ whenever the heads I are moved in a transverse direction, as hereinafter more fully explained. On the shaft H⁹ (see Figs. 1, 3, 4 and 14) is secured a friction wheel Q adapted to be driven from a friction wheel Q' on the main shaft P by the use of a friction pinion Q² and double friction pinions Q³ journaled in an arm Q⁴ and disposed on opposite sides of a vertical plane passing through the centers of the shafts P and H⁹. The arm Q⁴ is hung on the lower end of a lever Q⁵ fulcrumed loosely on the shaft H⁹ and connected at its upper end with a handle Q⁶ under the control of the operator, the handle Q⁶ extending transversely across the top of the machine to be within convenient reach of the operator standing in front of the machine. Normally the friction pinions Q² and Q³ are out of engagement with the friction wheels Q and Q', but when the handle Q⁶ is moved forwardly in the direction of the arrow a' then a swinging movement is given to the lever Q⁵ whereby the friction pinion Q² is moved in contact with both wheels Q and Q' so that the rotary motion of the wheel Q' is transmitted by the pinion Q² to the wheel Q to rotate the shaft H⁹. The rotary motion of the shaft H⁹ is transmitted by bevel gear wheels H⁸, H⁷ to the shafts H⁶ which by the bevel gear wheels H⁵, H⁴ rotate the screw rods H³ simultaneously to move the bearings H downward until the tools B are in the desired position relatively to the face of the block C. When this position has been reached the handle Q⁶ is returned to normal position, as shown in Fig. 3, so that the pinions Q², Q³ are both out of contact with the wheels Q and Q'. When it is desired to raise the guideways H and consequently the tools B, the operator pushes the handle Q⁶ rearward to move the friction pinions Q³ into engagement with the wheels Q and Q' to rotate the shafts H⁹, H⁶ and the screw rods H³ in a reverse direction with a view to raise the bearings H, and when the desired position is reached the handle Q⁶ is returned to normal position to move the pinion Q³ out of mesh with the wheels Q and Q'.

In order to move the heads I simultaneously in a transverse direction and with them the bearings H, the bed F, the tools B and the pneumatic hammers, the following arrangement is made: Transverse screw rods R screw in nuts I² on the heads I (see Fig. 2) and the said screw rods R are journaled in suitable bearings arranged on the guideways J and the main frame A. The rear ends of the rods R are provided with bevel gear wheels R' in mesh with bevel gear wheels R² secured on a shaft R³ extending longitudinally and journaled in suitable bearings arranged on the main frame A, as plainly shown in Figs. 1 and 14. On the shaft R³ is secured a friction wheel R⁴ adapted to be engaged by either a friction pinion R⁶ or double friction pinions R⁵ also adapted to move into engagement with a friction wheel P² attached to or secured on the main shaft P. The pinions R⁵ and R⁶ are journaled on an arm R⁷ pivoted on a bell crank lever R⁸ fulcrumed loosely on the shaft R³. The upper end of the bell crank lever R⁸ is connected with a handle R⁹ extending over the top of the machine to the front thereof so as to be within convenient reach of the operator in charge of the machine. Normally the friction pinions R⁵ and R⁶ are out of engagement with the peripheral face of the wheel R⁴ (see Fig. 3) and when it is desired to shift the heads I transversely then the operator pushes the handle R⁹ either forward or rearward according to the direction in which the heads I are to be moved at the time. Thus when the operator pushes the handle R⁹ forward in the direction of the arrow a' (see Fig. 3) then the bell crank lever R⁸ is rocked to throw the pinions R⁵ in engagement with the wheels R⁴ and P², and as the latter rotates with the shaft P it is evident that a revolving motion is transmitted by the wheels P², pinion R⁵ and wheel R⁴ to the shaft R³ which by the bevel gear wheels R², R' rotates both screws rods R simultaneously to move the heads I simultaneously in a forward direction on the guideways J. When the desired position is reached then the operator returns the handle R⁹ to normal position so that the pinion R⁵ moves out of engagement with the wheels P² and R⁴. When it is desired to move the heads I rearwardly then the handle R⁹ is shifted rearwardly to move the pinion R⁶ in engagement with the wheels P² and R⁴ to rotate the shafts R³ and the screw heads I in a reverse direction thus moving the heads I rearwardly on the fixed guideways J, and when the desired position is reached the handle R⁹ is returned to normal position.

Figures 5, 8:
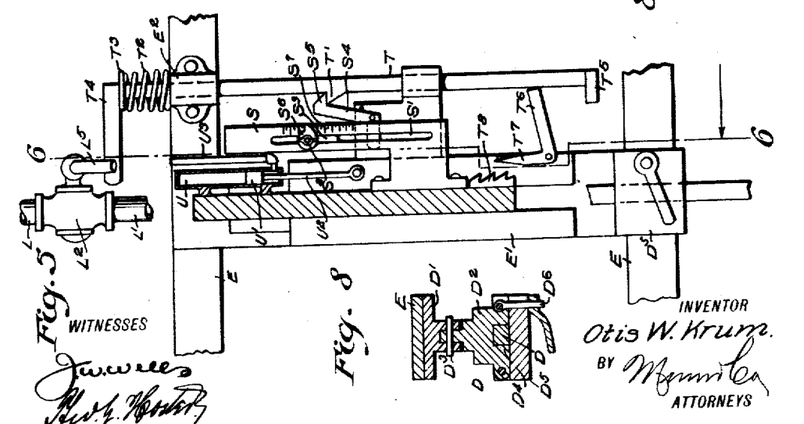
Fig. 5 is an enlarged sectional front elevation of one of the power-driven chisels.
Fig. 8 is a sectional plan view of the chisel holder, the section being on the line 8—8 of Fig. 6.
Figure 6:
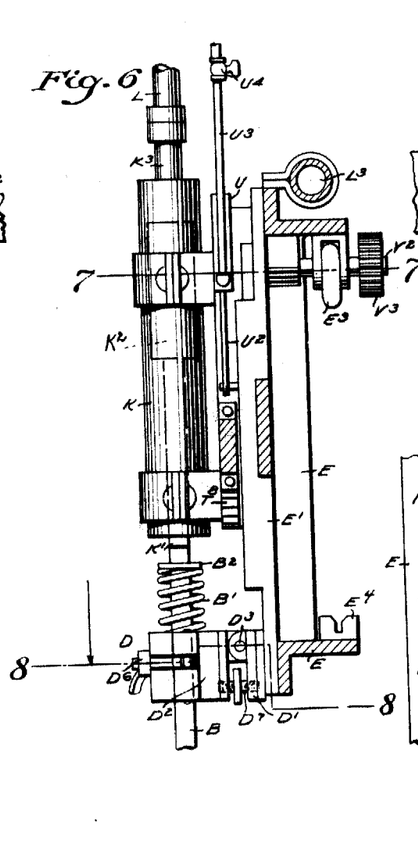
Fig. 6 is a cross section of the same on the line 6—6 of Fig. 5.
Figure 7:
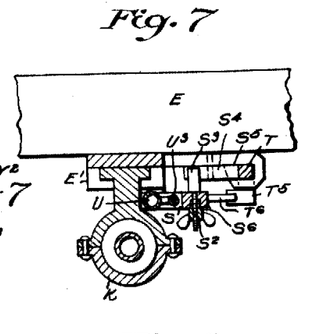
Fig. 7 is a sectional plan view of the same on the line 7—7 of Fig. 6.

In order to shut off the power from each hammer and to limit the downward sliding movement of each power hammer by its own gravity, the following arrangement is made, special reference being had to Figs. 5, 6 and 7: On the cylinder K of each power hammer is secured a bracket S having a vertically disposed slot S' through which extends a clamping screw $S^2$ engaging a block $S^3$ adapted to engage a tripping lever $S^4$ fulcrumed on the carriage E. The trip lever $S^4$ is provided with a hook $S^5$ adapted to engage a lug T' arranged on a vertically disposed rod T mounted to slide up and down in a suitable bearing $E^2$ arranged on the carriage E. The upper end of the rod T is pressed on by a spring $T^2$ resting on the bearing $E^2$ and engaging a collar $T^3$ fixed on the top of the rod T and from the top of the rod T extends an arm $T^4$ adapted to engage a handle $L^5$ on the valve $L^2$ previously mentioned, and which valve $L^2$ is normally open. The block $S^3$ is set a distance above the tripping lever $S^4$ and this distance is indicated by a pointer $S^6$ attached to the clamping screw $S^2$ and indicating on a graduation $S^7$ arranged on the bracket S. Now when the cylinder K moves downward the block $S^3$ moves with it and the latter finally engages the free end of the tripping lever $S^4$ thus swinging the hook $S^5$ thereof out of engagement with the lug T' to release the rod T which is now forced upward by the action of its spring $T^2$ to cause the arm $T^4$ to engage and turn the handle $L^5$ thus closing the valve $L^2$ and thereby shutting off the power from the cylinder K of the power hammer to stop the tool B. The lower end of the rod T is provided with a foot $T^5$ adapted to engage an arm $T^6$ of a pawl $T^7$ fulcrumed on the guideway E' of the carriage E and adapted to engage ratchet teeth $T^8$ attached to the cylinder K. Thus when the rod T moves upward by the action of the spring $T^2$, as previously explained, then the foot $T^5$ strikes the arm $T^6$ and swings the pawl $T^7$ into engagement with one of the ratchet teeth $T^8$ thus holding the cylinder K locked against further downward movement.

In order to aid each cylinder K in its downward movement by gravity use may be made of the following device: On each cylinder is secured a small air cylinder U in which reciprocates a piston U' having its piston rod $U^2$ attached to the guideway E' of the carriage E. A pressure supply pipe $U^3$ connected with the lower end of the cylinder U and is connected with the pipe $L^3$, and the pipe $U^3$ is provided with a valve $U^4$ which when opened permits compressed air to pass into the lower end of the cylinder U to exert a downward pressure on the cylinder thus aiding the cylinder K in its downward movement against the spring-pressed tool B.

The holder D (see Figs. 5, 6 and 8) is arranged as follows: A bracket D' is attached to the carriage E and on it is pivoted the holder body $D^2$ by the use of a pivot $D^3$ extending longitudinally to allow of swinging the body $D^2$ in a vertical direction. The body $D^2$ is provided at its front face with a recess $D^4$ into which slidingly fits the polygonal upper portion of the tool B to allow the tool to slide up and down in the said recess $D^4$. The front of the recess is closed by a cap $D^5$ hinged at one side and held in closed position by a pivoted clamping bolt $D^6$ of usual construction. A right and left hand screw $D^7$ engages the body $D^2$ and the bracket D' to permit the operator on turning the screw $D^7$ to swing the body $D^2$ into correct position so that the cutting edges of the several tools B are in longitudinal alinement with each other. By loosening the nut of the pivoted clamping bolt and swinging the latter rearwardly the cap $D^5$ can be readily swung into open position to allow of placing a tool B in position in the recess $D^4$ or removing it therefrom.

Figure 1:
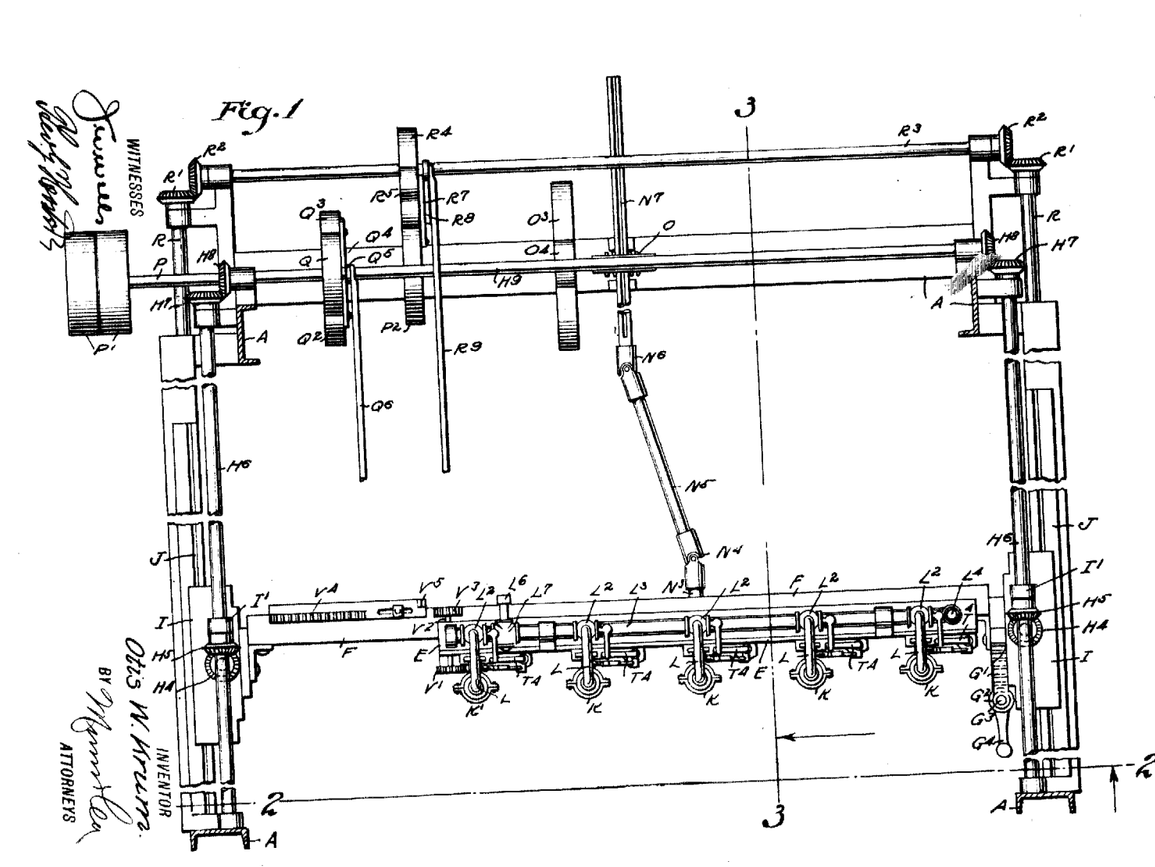
Figure 1 is a plan view of the cutting machine.
Figure 2:
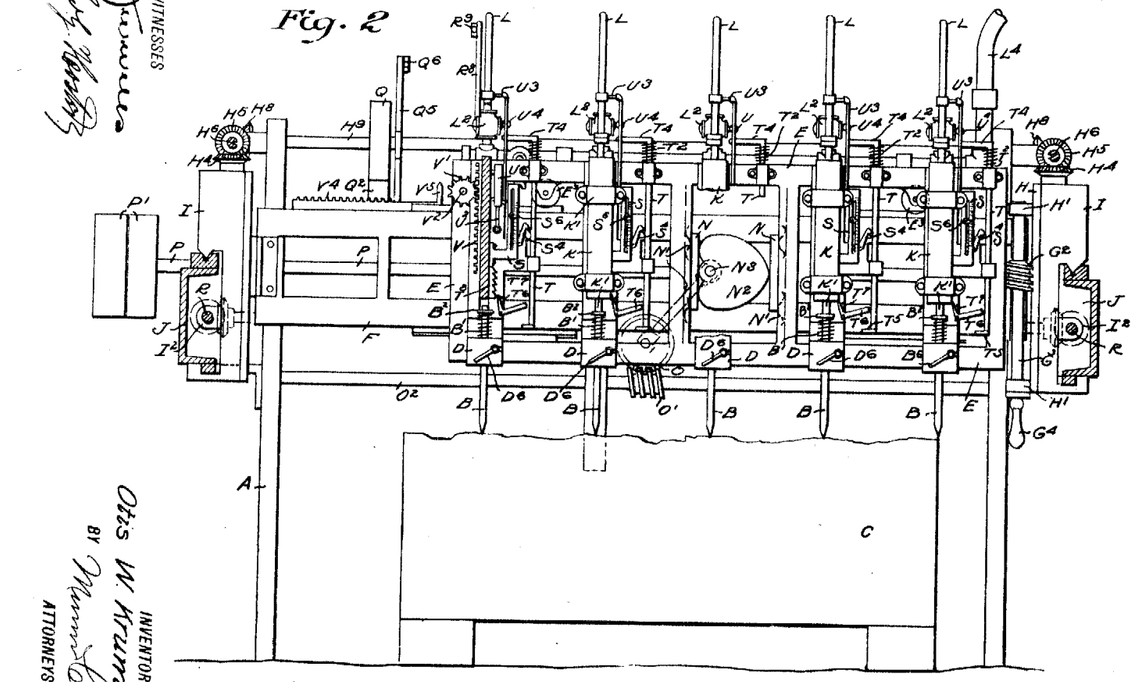
Fig. 2 is a sectional front elevation of the same on the line 2—2 of Fig. 1.
Figure 13:
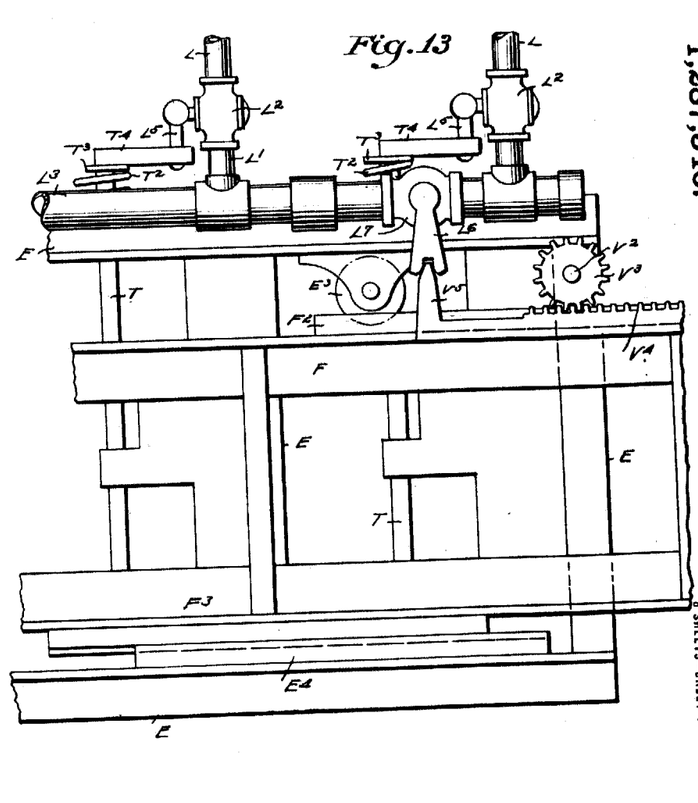
Fig. 13 is an enlarged rear elevation of the means for automatically cutting off the power from one of the end chisels.
Figure 14:
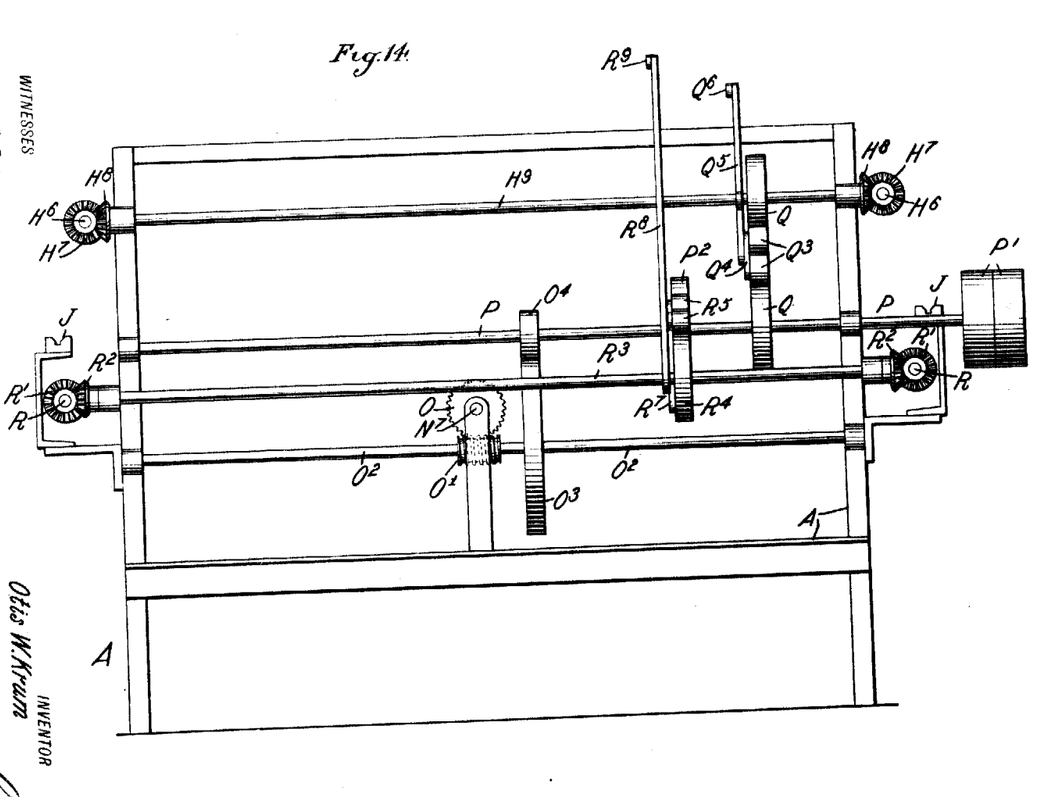
Fig. 14 is a rear elevation of the machine.

The tool B at the left-hand end of the row or gang of tools B is liable to move off the left-hand end of the block C during the return stroke of the carriage E from the right to the left and in order to stop this tool B during the time it is out of contact with the block C, the following arrangement is made: On the cylinder K of the power hammer for the left-hand tool B (see Fig. 2) is secured a rack V in mesh with a pinion V' secured on the forward end of a shaft $V^2$ extending transversely and journaled in suitable bearings arranged on the carriage E. The rear end of the shaft $V^2$ (see Fig. 13) is provided with a pinion $V^3$ adapted to move into engagement with a rack $V^4$ adjustably secured to the top of the carriage bed F, as shown in Figs. 1, 2 and 13. The rack $V^4$ is provided at its right-hand end with an upwardly extending tooth $V^5$ adapted to move into mesh with the fork end of a handle $L^6$ held on a valve $L^7$ arranged in the supply pipe $L^3$ adjacent the pipe L' for furnishing compressed air to the cylinder K of the left-hand power hammer. When the carriage E is on the return stroke from the right to the left and the left-hand tool B nears the left-hand end of the block C then the gear wheel $V^3$ moves into engagement with the rack $V^4$ thus turning the gear wheel $V^3$, the shaft $V^2$ and the gear wheel V' to impart an upward sliding movement to the rack V and consequently to the cylinder K to lift the left-hand tool B above the top of the block C, at the same time the tooth $V^5$ moves into engagement with the arm $L^6$ and imparts a swinging motion to the latter to close the valve $L^7$ with a view to shut off the power from the left-hand cylinder K of this power hammer. Thus during the remainder of the return stroke of the carriage E the left-hand power hammer is inactive and the tool B is in raised position a distance above the top of the block C. When the carriage E is on the forward stroke from the left to the right then the arm L⁶ finally moves out of engagement with the tooth V⁵ to turn on the power and the shaft V² is turned in the reverse direction by the gear wheel V³ running along the rack V⁴ and finally out of engagement therewith so that the gear wheel V' is turned in the reverse direction and causes the rack V and the cylinder K to slide downward to reëngage the point of the cutting tool B with the face of the block C at the left-hand end thereof.

The carriage E is preferably provided near its top with friction wheels E³ (see Figs. 2, 3 and 6) traveling in guideways F² arranged on the top of the bed F, and the bottom of the bed F is provided with U-shaped shoes F³ engaging corresponding guideways E⁴ on the carriage E to insure an easy sidewise reciprocating movement of the carriage E on the bed F.

The operation is as follows:

When the machine is running then a reciprocating movement in a sidewise direction is given to the carriage E and the cutting tools B receive blows in rapid succession by the power hammers so that the cutting edges of the tools B cut the face of the block C in a longitudinal direction. The operator in charge of the machine turns the handle G⁴ whenever it is necessary to set the cutting tools B at an angle to the configuration to be produced and the operator manipulates the handle Q⁶ for a downward feeding of the carriage as the cutting proceeds in the face of the block C and the operator manipulates the handle R⁹ correspondingly to feed the carriage in a transverse direction according to the design so that the tools readily cut the face of the block C according to the predetermined design C'.

By setting the tripping device, that is, the block S³, a desired distance from the tripping lever S⁴, as previously explained, it is possible that any one of the power hammers can be rendered inactive as soon as the corresponding tool B reaches a predetermined depth in the face of the block C. It will also be noticed that the end tool is raised from the work in case the tool is carried beyond the end of the block and the tool is returned automatically to cutting position as soon as it is again over the face of the block.

Having thus described my invention, I claim as new and desire to secure by Letters Patent:

1. A cutting machine comprising a carriage, a vertically disposed cylinder mounted on the carriage to slide by gravity, means for admitting a motive fluid to the cylinder, means controlled by the cylinder for cutting off the motive fluid and locking the cylinder from downward movement, a piston in the cylinder, and a sliding and spring pressed tool below the cylinder and normally in engagement with the piston rod.

2. In a cutting machine, a carriage, means for operating the carriage, a plurality of power hammers mounted to slide on the carriage by gravity, a cutting tool on the carriage below each power hammer, and means for imparting an upward sliding movement to one of the hammers on the return movement of the carriage.

3. In a cutting machine, a carriage, means for operating the carriage, a plurality of cylinders mounted on the carriage to slide by gravity, means for admitting a motive agent to each cylinder, a piston on each cylinder, a cutting tool adapted to be operated by each piston, means for imparting an upward sliding movement to one of the cylinders and simultaneously cutting off the supply of motive agent from the cylinder, on the return movement of the carriage.

4. A cutting machine, comprising a row of power-actuated cutting tools, power supply means for supplying the said power-actuated cutting tools with power, and power-controlling means for automatically cutting off the power from one of the end cutting tools whenever the said end cutting tool reaches a predetermined point and at the time it is out of contact with the work and for turning on the power whenever the said end cutting tool returns to the work.

5. A cutting machine, comprising a row of power-actuated cutting tools, a carriage on which the said cutting tools are mounted, a bed on which the said carriage is mounted to reciprocate, yieldingly mounted spaced bearing plates on the said carriage, and a a driven cam having its peripheral face in contact at opposite sides with the said bearing plates.

6. A cutting machine, comprising cutting tools, a carriage on which the said cutting tools are mounted, a bed on which the said carriage is mounted to reciprocate, yieldingly mounted spaced bearing plates on the said carriage, a heart-shaped cam interposed between the said bearing plates and having a shaft, a driven shaft mounted to slide in the direction of its axis, and a universal coupling connecting the said cam shaft with the said driven shaft.

7. A cutting machine, comprising a reciprocating carriage, a power hammer mounted to slide up and down on the said carriage, and adapted to operate a cutting tool, a power supply pipe connected with the said power hammer and having a shut-off valve, a spring-pressed rod slidable on the carriage and controlling the said valve, a locking device engaging the said rod to normally hold the same locked against the tension of its spring, and a tripping device on the said power hammer and adapted to trip the said locking device.

8. A cutting machine, comprising a reciprocating carriage, a power hammer mounted to slide up and down on the said carriage, and adapted to operate a cutting tool, a power supply pipe connected with the said power hammer and having a shut-off valve, a spring-pressed rod slidable on the carriage and controlling the said valve, a locking device engaging the said rod to normally hold the same locked against the tension of its spring, a tripping device on the said power hammer and adapted to trip the said locking device, a rack on the said power hammer, and a pawl for engagement with the said rack and fulcrumed on the carriage, the pawl being controlled by the said rod.

9. A cutting mechanism, comprising a reciprocating carriage, a power hammer mounted to slide up and down on the said carriage, and adapted to operate a cutting tool, a power supply pipe connected with the said power hammer and having a shut-off valve, a spring-pressed rod slidable on the carriage and controlling the said valve, a locking device engaging the said rod to normally hold the same locked against the tension of its spring, a tripping device on the said power hammer and adapted to trip the said locking device, the said tripping device being adjustably held on the power hammer, a pointer on the tripping device, and a linear graduation on the said power hammer and on which indicates the said pointer.

10. A cutting machine, comprising a carriage, a power hammer mounted to slide down on the carriage by its own gravity, means for locking the hammer from downward movement, a tool holder on the carriage below the said power hammer, a tool mounted to slide up and down in the said holder and on the top of which rests the lower end of the piston rod of the said power hammer, and a spring supporting the said tool.

11. A cutting machine, comprising a carriage, a bed on which the carriage is mounted to reciprocate, a power hammer mounted to slide up and down on the said carriage, and coacting means on the said carriage, bed and hammer to raise and lower the latter automatically during a portion of the stroke of the carriage.

12. A cutting machine, comprising a carriage, a bed on which the carriage is mounted to reciprocate, a power hammer mounted to slide up and down on the said carriage, coacting means on the said carriage, bed and hammer to raise and lower the latter automatically during a portion of the stroke of the carriage, and coacting means on the said carriage and bed for automatically shutting off the power to the said hammer during a part of the stroke of the carriage.

13. A cutting machine, comprising a carriage, a bed on which the carriage reciprocates, a power hammer mounted to slide up and down on the said carriage, a hammer rack on the said hammer, a bed rack on the said bed, and a shaft journaled on the said carriage and provided with gear wheels of which one is in mesh at all times with the said hammer rack and the other is adapted to mesh with the said bed rack during a part of the stroke of the carriage.

14. A cutting machine, comprising a carriage, a bed on which the carriage reciprocates, a power hammer on the said carriage, a supply pipe mounted on the carriage and connected with the said hammer, a valve in the said supply pipe, and coacting controlling means on the said bed and valve for closing and opening the valve during a portion of the stroke of the carriage.

15. A cutting machine, comprising a carriage, a bed on which the carriage reciprocates, a power hammer on the said carriage, a supply pipe mounted on the carriage and connected with the said hammer, a valve in the said supply pipe, an arm on the said valve and having a fork, and a tooth on the said bed and adapted to be engaged by the said fork of the arm during a portion of the stroke of the carriage to alternately close and open the valve.

In testimony whereof I have signed my name to this specification in the presence of two subscribing witnesses.

OTIS W. KRUM.

Witnesses:
Theo. G. Hoster,
George H. Emslie.

Copies of this patent may be obtained for five cents each, by addressing the "Commissioner of Patents, Washington, D. C."